Nov. 17, 1970    M. G. LEONARD    3,541,487
ELECTRICAL WINDING HAVING HEAT EXCHANGERS BETWEEN LAYERS
OF THE WINDING FOR COOLING THE WINDINGS
Filed Nov. 18, 1968    2 Sheets-Sheet 1

INVENTOR
Merrill G. Leonard
BY F. E. Browder
ATTORNEY

# United States Patent Office 3,541,487
Patented Nov. 17, 1970

3,541,487
ELECTRICAL WINDING HAVING HEAT EXCHANGERS BETWEEN LAYERS OF THE WINDING FOR COOLING THE WINDINGS
Merrill G. Leonard, Fowler, Ohio, assignor to Westinghouse Electric Corporation, Pittsburgh, Pa., a corporation of Pennsylvania
Filed Nov. 18, 1968, Ser. No. 776,518
Int. Cl. H01f 27/18
U.S. Cl. 336—58                              9 Claims

ABSTRACT OF THE DISCLOSURE

An electrical winding for use in electrical transformers. The winding comprises several sections having a plurality of layers of conducting material in each section. A heat exchanger having a heat input portion and a heat output portion is positioned with the heat input portion in close thermal proximity to layers of the winding and with the heat output portion extending beyond the confines of the windings for dissipating heat generated within the winding.

BACKGROUND OF THE INVENTION

Field of the invention

This invention relates to electrical windings comprising a plurality of layers of electrical conductors, and more particularly to electrical windings for transformers and like electrical apparatus with heat exchanger means for cooling the windings.

Description of the prior art

In the prior art it has been the practice to cool electrical windings of transformers by immersing the winding in a liquid dielectric. The liquid dielectric takes the heat from the winding to the outer casing, which could have a heat exchanger associated therewith, where the heat is dissipated by the ambient atmosphere or forced air. In some dry type transformer apparatus the reat of the windings is dissipated by circulating air about the windings. This may be ambient air or cooled air. These methods are satisfactory, but slow and they also have other limitations as to how much heat can be removed by these methods from the internal structural of the winding. Accordingly, it is the main object of this invention to cool the windings of a transformer by providing a heat exchanger having a heat input portion and a heat output portion. The heat input portion of the heat exchanger is wound between adjacent layers of the conductor of the winding, in close thermal proximity to the adjacent layers of the conductor of the winding, and the heat output portion of the heat exchanger extend beyond the confines of the winding for dissipating heat generated in the winding. This heat exchanger is effective for rapidly removing heat generated internally within the winding. With this arrangement there is no delay for the heat to pass to the outside of the winding before it may be dissipated by the dielectric or air as in the prior art devices.

SUMMARY

This invention provides a winding for transformers or like electrical apparatus comprising a plurality of concentric layers of electrical conductor. The conductor may be of the strand or sheet type. In transformers the winding usually comprises at least one high voltage section and one low voltage section. Heat is removed from internally of the winding by means of a heat exchanger comprising a heat input portion and a heat output portion. The heat input portion of the heat exchanger is wound between adjacent layers of the winding, usually between the adjacent layers of the high voltage winding in transformers, where most of the heat is generated and in close thermal proximity to the adjacent layers of the winding. The heat output portion of the heat exchanger extends from the winding, beyond its confines, where it dissipates the heat generated internally of the winding by electrical current flowing in the winding or by other means, such as flux distribution in any associated magnetic circuit. Rapid dissipation of the heat from the output portion of the heat exchanger can be expedited by exposing the heat output end of the heat exchanger to additional heat sinks, such as a reservoir of liquid dielectric material, ambient or refrigerated air, water or any other suitable material for dissipating heat rapidly. As many heat exchangers as necessary may be wound between the layers of conductor in the winding to properly cool the winding. In some applications the entire winding will be encased in a plastic or molded housing. In these applications the heat output ends of the heat exchanger will extend through the housing for dissipating heat generated internally in the winding.

DESCRIPTION OF THE PREFERRED EMBODIMENTS

Figure 1:
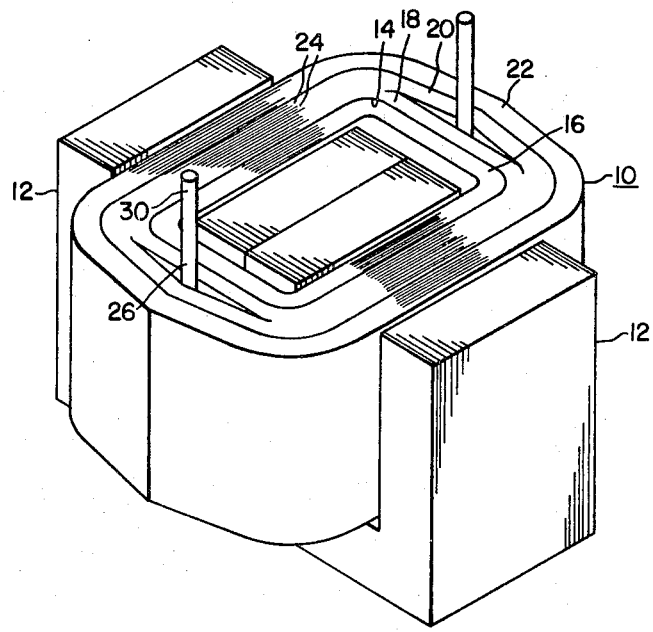
FIG. 1 is a perspective view of a winding for a distribution transformer, with two core loops associated therewith, with parts broken away for clarity, incorporating this invention.

Throughout the description which follows like reference characters indicates like parts in the various figures of the drawings.

Referring to FIG. 1 of the drawing, this figure illustrates in perspective a winding 10 which may be used for the coil of a transformer. A pair of core loops 12 having parts broken away for clarity are shown positioned in the window 14 of the winding 10 in the manner in which they would be associated with the winding 10 in a completed transformer.

The winding 10 which is used for the coil of the transformer comprises an inside low voltage section 16 and two inside high voltage sections 18 and 20 and an outside low voltage section 22. Each of the sections 16, 18, 20 and 22 is composed of a plurality of layers 24 of electrical conducting material. These layers 24 of electrical conductor may be either conventional strand conductor or they may be sheet conductors, with the width of each sheet being equal to the height of the winding 10. As seen from FIG. 1 the sections of the winding sections 16, 18, 20 and 22 of the winding 10 are arranged concentrically to provide the transformer coil. A heat exchanger 26 having a heat input end 28 and a heat output end 30 is wound between the high voltage sections 18 and 20 of the winding 10, at each end of the winding 10, with the heat exchangers 26 in close thermal contact or proximity with the adjacent layers 24 of the winding sections 18 and 20.

The heat output end 30 of the heat exchanger 26 extends beyond the confines of the windings 10 for quite a distance.

Figure 5:
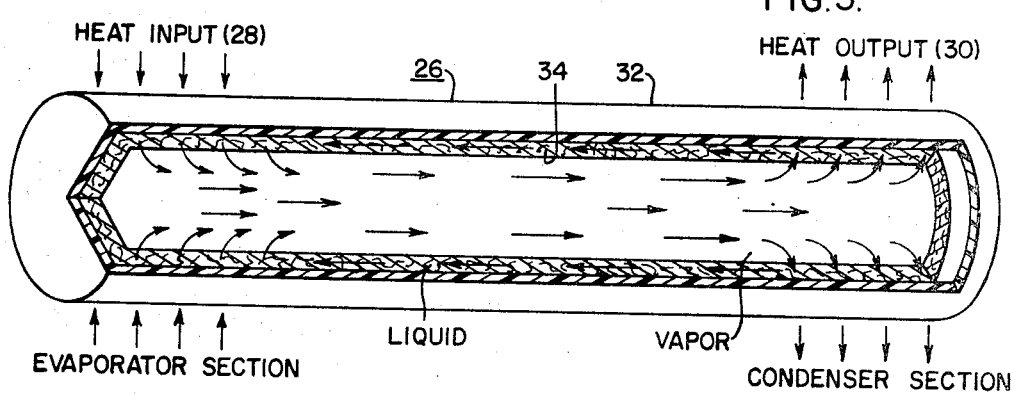
FIG. 5 is a partial sectional view illustrating the details of a heat exchanger used in this invention.

For details of the heat exchanger 26 reference is made to FIG. 5 which shows a sectional view of a heat exchanger of the type used in this invention. The heat exchanger 26 comprises an outside container 2 which is completely closed and evacuated. A hollow cylindrical wick 34 lines the inside of the container 32 and the hollow space inside the hollow wick 34 contains an insulating liquid, such as a liquid fluoridated hydrocarbon material.

The operation of this heat exchanger is as follows. The application of heat to the heat input end 28 of the container 32 causes the fluoridated hydrocarbon material to evaporate from the wick 34 and also increases the vapor pressure at the heat input end 28. As a result of this increased vapor pressure at the heat input end 28 the vapor due to the vaporization of the fluoridated material moves through the inside of the container 32, carrying heat energy toward the heat output end 30 of the container 32. Heat is removed from the container at the heat output end 30 of the container 32 by any of the means which will be described hereinafter and the vapor condenses and goes back into the wick 34. The condensed vapor returns as liquid fluoridated hydrocarbon to the heat input end 28 of the heat exchanger 32 by capillary action. A wick return for the liquid fluoridated hydrocarbon is preferred where there is no gravity force to return the liquid; however when there is gravity force to return the liquid, the wick may be eliminated.

Because the fluoridated hydrocarbon material boils and condenses at roughly the same temperature, the temperature along the entire length of the container 32 tends to be uniform. The heat exchanger 32 shown in FIG. 5 is constructed entirely of insulating materials; for example, the container 32 may be made of ceramic material, the wick 34 may be made of fiber glass and the insulating liquid may be fluoridated hydrocarbon material. This heat exchanger provides a very rapid efficient means for conveying heat from the inside of the winding 10 to the exterior of the winding 10 where the heat may be rapidly and economically dissipated from the heat output end 30 of the heat exchanger 32 by means of some convenient heat sink which will absorb and dissipate a large amount of heat in a very short time. A detailed discussion of the type of heat exchanger 26, as shown in FIG. 5, is disclosed in "Scientific American," May 1968 pages 38 through 46.

In the arrangement shown in FIG. 1 only two heat exchangers 26 have been shown; however, it is understood that any desired number of heat exchangers 26 may be employed to cool the winding 10. The number of heat exchangers used will usually be dictated by the amount of heat that must be dissipated. The heat which is removed from the internal portion of the winding 10 by the heat exchangers 26 may be dissipated from the heat output ends 30 of the heat exchangers by exposing the ends 30 of the heat exchangers to ambient air or by forced cooling, as by blowing ambient air across the ends 30 of the heat exchangers 26. This type of heat exchanger is referred to in the industry as a "heat pipe" since it readily pumps heat from the heat input end of the exchanger to the heat output end of the exchanger.

Figure 2:
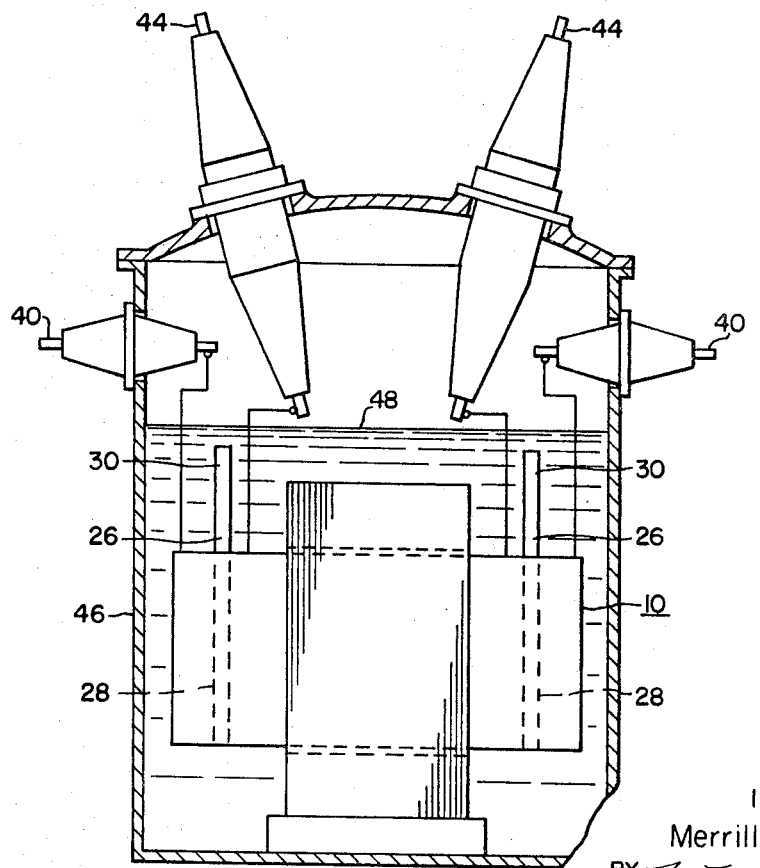
FIG. 2 is a sectional view of a transformer incorporating this invention, showing how the heat from the heat output ends of the heat exchanger may be dissipated by a heat sink of liquid dielectric.

FIG. 2 illustrates a transformer incorporating a plurality of heat exchangers 26 for removing heat internally of the winding 10 of the transformer. This figure illustrates a conventional distribution transformer having a low voltage winding with terminals 40 for connecting the low voltage windings to a load and having a high voltage winding with terminals 44 for connecting the high voltage windings to a distribution transmission line. The transformer comprising the winding 10 and the cores 12 is contained in a closed tank 46, and the tank is filled with a liquid dielectric 48 to cover the output ends 30 of the heat exchangers 26. The liquid dielectric 48 functions as a heat sink to absorb the heat which the heat exchangers 26 pump out the internal structure of the winding 10. The liquid dielectric 48 takes the heat to the sidewalls of the casing 46 where it is dissipated by ambient air or some other suitable cooling method.

Figure 3:
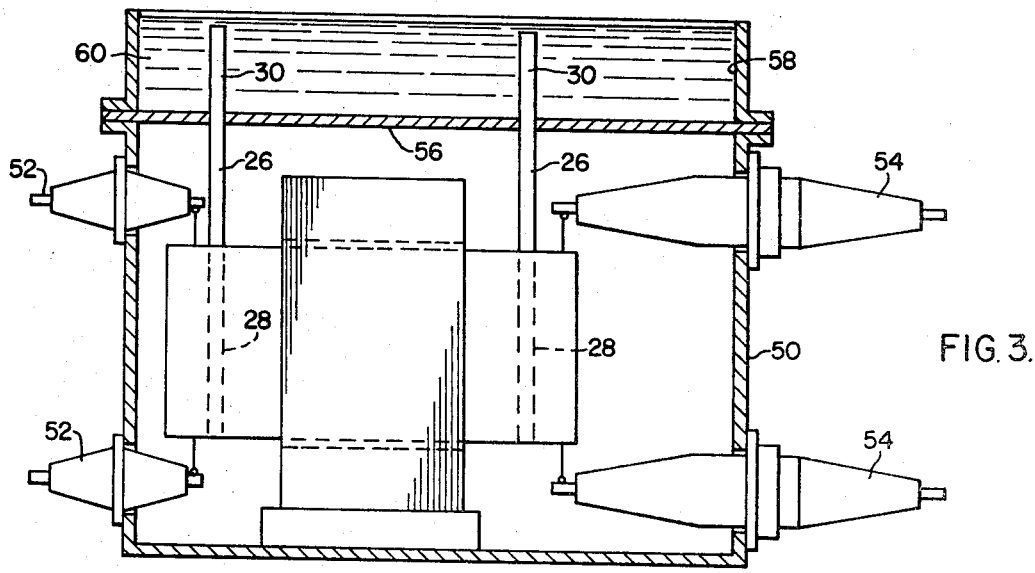
FIG. 3 is a sectional view of a transformer incorporating the present invention showing how the heat from the heat output ends of the heat exchanger may be dissipated in a heat sink of water.

FIG. 3 illustrates a transformer comprising a casing 50 having a core 12 and a winding 10 assembled therein to provide a transformer. Low voltage bushings 52 pass through the casing 50 for connecting conductors to the low voltage windings of the low voltage coils of the winding 10. High voltage bushings 54 pass through the walls of the casing 50 for connecting conductors to the high voltage coils of the winding 10. The winding 10 in this figure also has wound therein a plurality of heat exchangers 26 with the heat input ends 28 of the heat exchangers embedded between the layers of the windings 10 as explained in connection with FIGS. 1 and 2. The heat output ends 30 of the heat exchangers 26 extend through an upper wall 56 of the casing 50 and terminate in a container 58. This container may be filled with water 60 to provide a heat sink for rapidly dissipating the heat from the heat output ends 30 of the heat exchangers 26. The reservoir 58 may be open to ambient atmosphere to facilitate removal of heat from the water, or it may be closed and water may be circulated through the reservoir 58 to expediate the removal of heat pumped out of the winding 10 by the heat exchangers 30.

Figure 4:
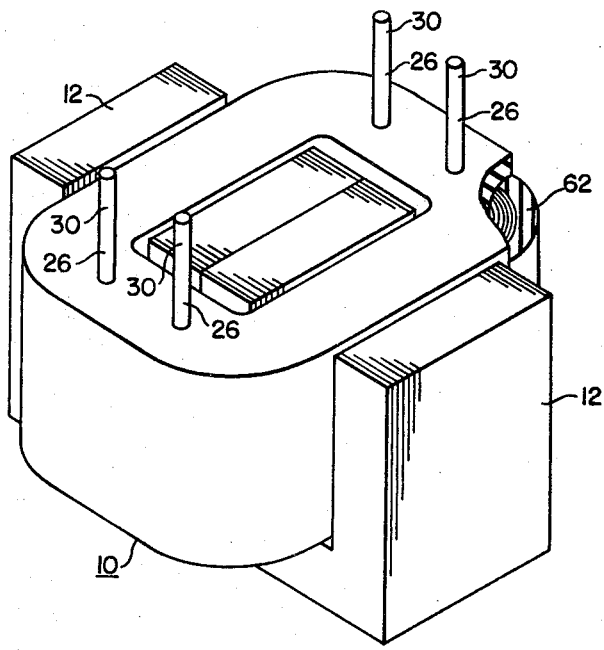
FIG. 4 is a perspective view of a winding incorporating the present invention with two core loops associated therewith, with parts broken away for clarity, illustrating how the entire winding may be encapsulated in a molded housing.

FIG. 4 illustrates an embodiment of the invention wherein the entire winding 10 is encapsulated in a cast or molded casing 62 of plastic or rubber or other suitable material. In this embodiment the heat output ends 30 of a plurality heat exchangers 26 are molded through the casing 62 with a water tight joint around the heat exchangers 26. Heat from the heat output portions 30 of the heat exchangers 26 may be removed from this type of coil by any of the means described hereinbefore.

From the foregoing description taken in connection with the drawings it is seen that this invention has provided a winding which may comprise the high voltage and low voltage coils of a transformer and means comprising heat exchangers or "Heat Pipes" embedded between the layers of the winding for rapidly removing heat generated internally of the windings for improving the efficiency of the transformer.

I claim:

1. An electrical winding comprising a plurality of layers of concentric turns of electrical conducting material, a heat exchanger comprising a closed tubular member containing a volatile fluid and having a heat input portion and a heat output portion, the heat input portion of said heat exchanger being positioned between layers of said winding in close thermal proximity to layers of said winding and the heat output portion of said heat exchanger extending beyond the confines of said winding to dissipate heat generated within said winding.

2. The apparatus of claim 1 wherein said heat exchanger comprises a closed container, a wick inside said closed container and adjacent the inside walls thereof, the space inside said wick comprising a cavity, a volatile fluid material in said cavity, the heat input portion of said heat exchanger being in close thermal proximity to layers of said winding to permit heat generated in said winding to evaporate said volatile fluid material, which vapor passes through said cavity to the heat output portion of said heat exchanger where said vapor is condensed to a liquid, which liquid passes through said wick back to the heat input portion of said heat exchanger.

3. The apparatus of claim 1 wherein the heat output portion of said heat exchanger is exposed to air for dissipating heat generated in said windings.

4. The apparatus of claim 1 wherein the heat output portion of said heat exchanger is in contact with a heat sink comprising water for dissipating heat generated in said windings.

5. The apparatus of claim 1 wherein the heat output portion of said heat exchanger is immersed in a heat sink comprising a reservoir of water and the surface of the water is exposed to ambient atmosphere.

6. The apparatus of claim 1 wherein the heat output portion of said heat exchanger is exposed to liquid dielectric for dissipating heat generated in said windings.

7. The apparatus of claim 1 wherein a plurality of said heat exchangers are provided with their heat input portions between layers of said winding, and a molded housing surrounding said winding with the heat output portions of said heat exchanger extending through said molded housing.

8. In a transformer, a wound coil comprising a high voltage winding of a plurality of concentric layers of conductor, a low voltage winding of a plurality of layers of concentric conductor, said high voltage and said low voltage windings being arranged concentrically, a heat exchanger having a heat input portion and a heat output portion, the heat input portion of said heat exchanger being located in good terminal relationship between adjacent layers of conductors of said coil and the heat output portion of said heat exchanger extending beyond the confines of said coil for dissipating heat generated in said coil, said heat exchanger comprising a closed tubular member containing a volatile fluid.

9. The apparatus of claim 8 wherein the heat input portion of said heat exchanger is located between adjacent layers of said high voltage winding.

References Cited

UNITED STATES PATENTS

| | | | |
|---|---|---|---|
| 854,278 | 5/1907 | Darlington | 336—58 XR |
| 2,542,851 | 2/1951 | Wentz et al. | 336—61 |
| 2,825,034 | 2/1958 | Birchard | 336—61 |
| 2,770,785 | 11/1956 | Haagens et al. | 336—61 |
| 2,992,405 | 7/1961 | Ursch | 336—61 XR |
| 3,179,908 | 4/1965 | Peabody | 336—61 |
| 3,229,759 | 1/1966 | Grover | 165—105 |
| 3,302,042 | 1/1967 | Grover et al. | 165—105 |
| 3,405,299 | 10/1968 | Hall et al. | 165—105 XR |

THOMAS J. KOZMA, Primary Examiner

U.S. Cl. X.R.

165—105; 174—15; 336—61